Aug. 20, 1935. K. D. STORCH 2,012,205
SUPPORT FOR AUTOMOBILE HOODS
Filed July 24, 1934 3 Sheets-Sheet 3
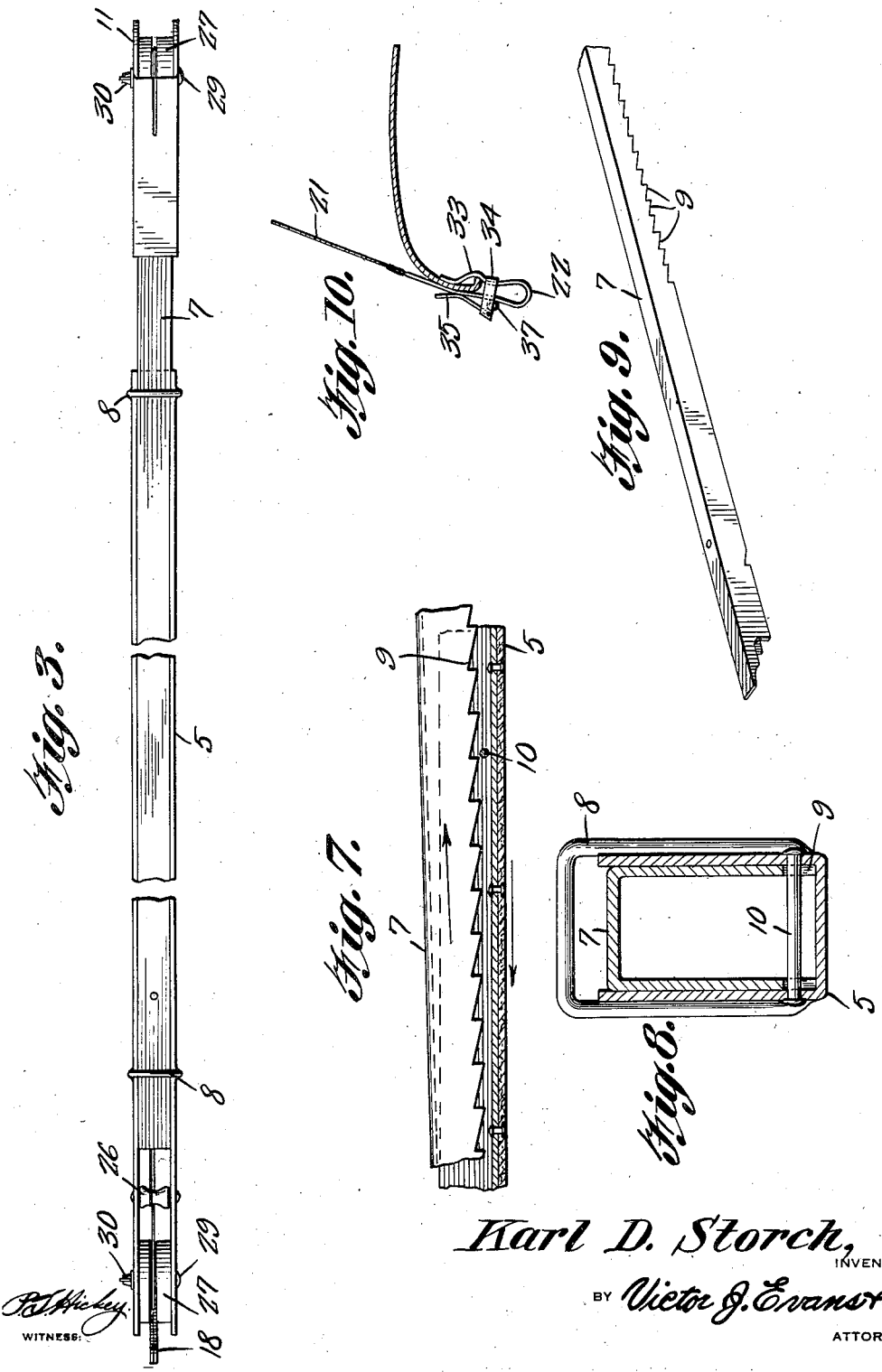
Karl D. Storch,
INVENTOR
BY Victor J. Evans & Co.
ATTORNEY Patented Aug. 20, 1935

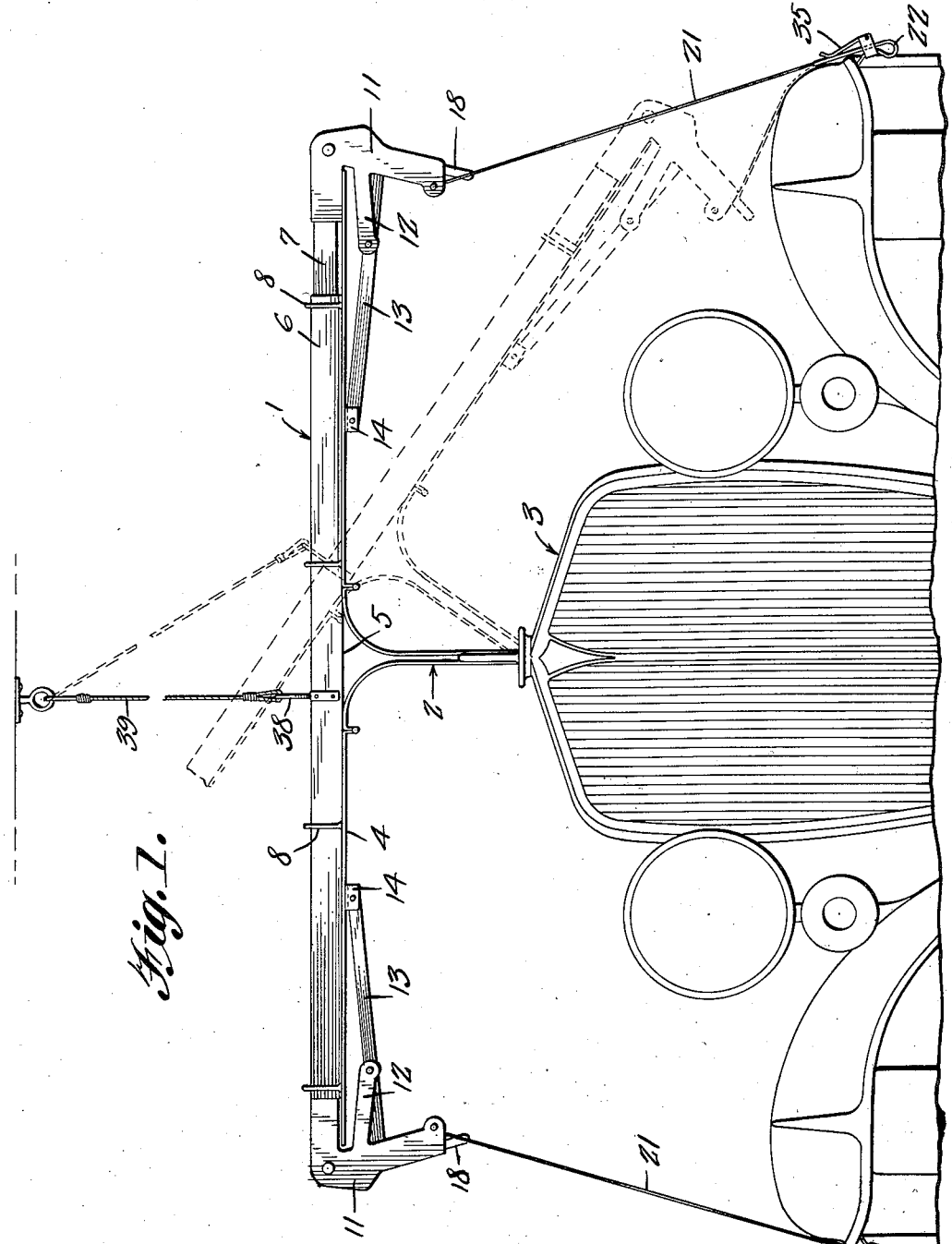

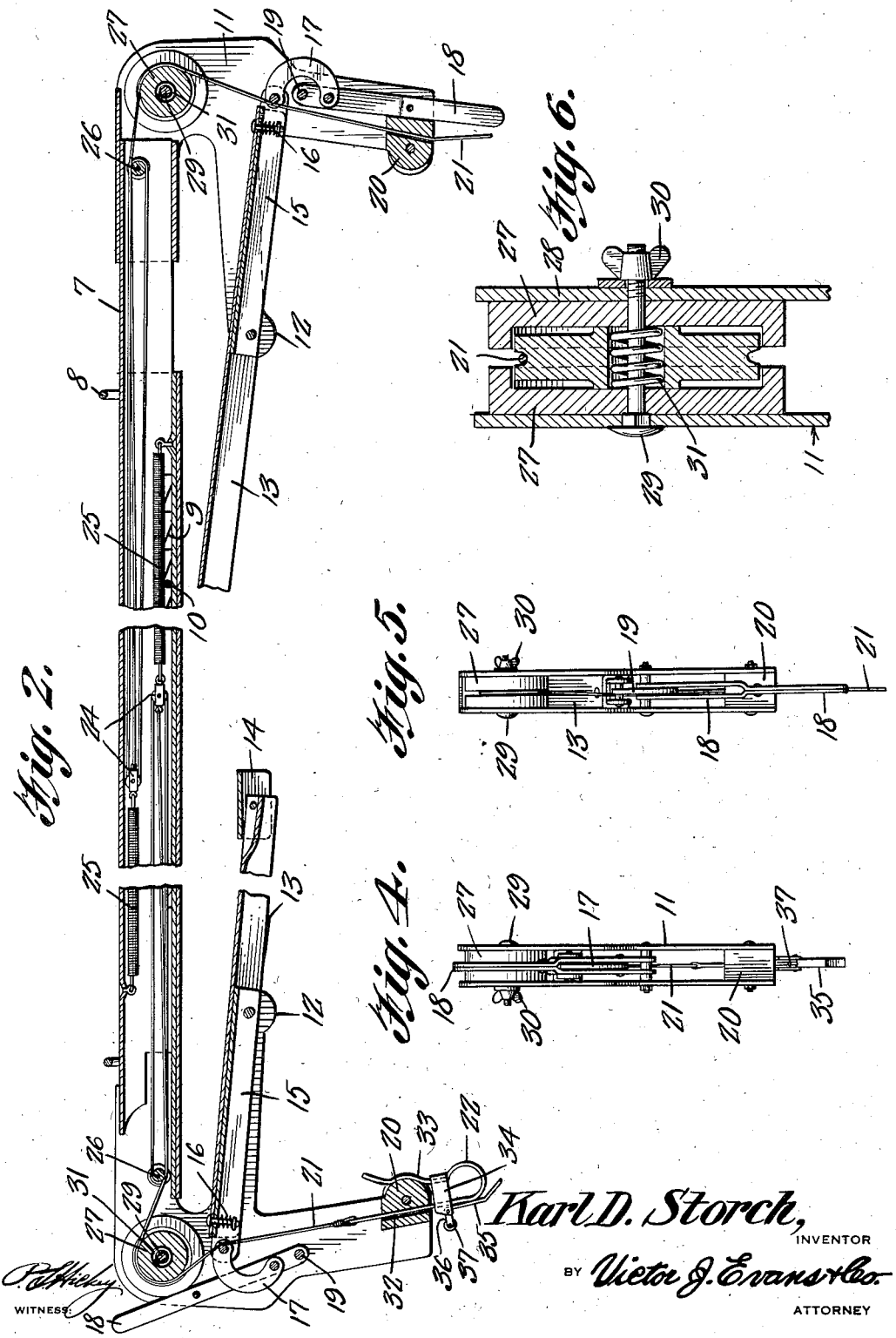

2,012,205

UNITED STATES PATENT OFFICE 2,012,205

SUPPORT FOR AUTOMOBILE HOODS

Karl D. Storch, Pittsburgh, Pa.

Application July 24, 1934, Serial No. 736,728

7 Claims. (Cl. 280—150)

This invention relates to supports of the character set forth in my U. S. Letters Patent granted July 4, 1933 and numbered 1,917,074 and has for the primary object the provision of an improved construction of hood engaging means to permit of the device being readily applied and removed from the hood sections of a motor vehicle and when applied thereto any danger of the hood slipping or becoming accidentally freed is obviated.

Another object of this invention is the provision of an adjustable means whereby the hood sections may be firmly supported at different inclinations at either side of the motor vehicle and which means is carried by and adjustable relative to the hood engaging means.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a hood support mounted to a fragmentary portion of a motor vehicle and showing in dotted and full lines several positions in which the hood may be supported.

Figure 2 is a vertical sectional view illustrating the device.

Figure 3 is a top plan view illustrating the device.

Figure 4 is an end view illustrating one of the hand levers positioned to release its respective hood clamp so that the device may be applied or removed from the hood.

Figure 5 is a similar view showing one of the hand levers positioned to adjust the hood clamp for gripping the hood.

Figure 6 is an enlarged detail sectional view illustrating one of the cable pulleys and its means of adjustment to permit gripping of the cable.

Figure 7 is a fragmentary sectional view showing the adjustable connection between the sections of the hood engaging member.

Figure 8 is a transverse sectional view showing the means of slidably connecting the sections of the hood engaging member.

Figure 9 is a fragmentary perspective view illustrating one of the sections of the hood engaging member.

Figure 10 is a detail sectional view illustrating a cable clamp for connecting the cable to a fender of the motor vehicle.

Referring in detail to the drawings, the numeral 1 indicates a hood engaging bar adapted to be arranged transversely of a hood 2 of a motor vehicle 3, as shown in Figure 1, with the side portions or hood sections 4 of the hood 2 in engagement therewith positioning said hood sections in a horizontal plane and at a distance above the engine of the motor vehicle so that a mechanic may easily work upon the engine from either side thereof without being interfered by the hood. A suitable protecting strip 5 is secured to the bar 1 for the sections 4 of the hood to engage. The bar 1 consists of telescopic sections 6 and 7 each of channel iron construction and the section 6 is equipped with retaining element 8 which overlie the section 7 and prevent lifting of the section 7 out of the section 6 but which will permit a limited movement of the section 7 outwardly of the section 6. The section 7 has a series of notches 9 to engage with a pin 10 of the section 6 for locking or retaining the section 7 from moving outwardly of the section 6 in an endwise direction. The notches 9 can be disengaged from the pin 10 by movement of the section 7 away from the section 6 so that the section 7 may be moved endwise to increase and decrease the length of the bar for adapting it to different size hoods.

L-shaped heads 11 are secured to the sections 6 and 7 of the bar 1 and carry spaced arms 12 to which are pivoted hood clamps 13 each of channel iron construction and extend in the direction of each other to engage with the inner faces of the hood sections 4, as clearly shown in Figure 1. Feet 14 are pivoted to the hood clamps 13 to contact with the hood sections. The outer ends of the hood clamps 13 receive therein channel iron members 15 which are apertured to receive the pivots of the hood clamps and also are connected to the hood clamps 13 by yieldable means 16. The channel iron members 15 project beyond the outer ends of the hood clamps and have pivoted thereto arcuate shaped links 17 which are in turn pivotally connected to hand levers 18, the latter being pivoted to the heads 11, as shown at 19, whereby the hood clamps can be caused to engage and disengage with the hood sections 4 of the hood 2. The yieldable means 16 between the hood clamps and the channel iron members 15 prevent excessive force upon the hand levers from being transmitted to the hood sections and eliminate endangering or injuring said hood sections by said forces. The yieldable means 16 also permit the hand levers to be swung from one position to another as shown in Figure 2. The hood clamps engage the hood sections with sufficient force to prevent accidental movement of the bar 1 on the hood and when in this position they act to retain the pin 19 in the notches 9 and prevent elongating or shortening of the bar 1. The arcuate-shaped links 17 retain the hand levers 18 in hood clamping position as will be clearly noted by referring to the right hand lever shown in Figure 2.

The heads 11 carry guides 20 to slidably receive cables 21 and the latter move inwardly and outwardly of the bar 1 under tension and carry at their free ends clamps 22 to engage with the fenders of the motor vehicle, as shown in Figure 1. The cables are trained over guide pulleys 23 carried by the heads and enter the channeled sections 6 and 7 of the bar 1 and each cable passes over a sheet 24 connected to a coil spring 25 secured within the bar 1. The cable after passing over the sheet 24 passes over a guide pulley 26 and is then secured to the sheet providing a construction which will permit the cable to be extended and retracted relative to the bar. Each guide pulley 23 is of the grooved type and is mounted between a pair of bearing sections 27 confined between flexible walls 28 of the heads 11. The bearing sections 27 are flanged to overlie the periphery of the pulley 23 and extending through the walls 28, bearing sections 27 and the hub of the pulley is an adjusting bolt 29 having a wing nut 30 threaded thereto. Surrounding the bolt 29 and located between the bearing sections is a coil spring 31 which acts to normally force the bearing sections away from each other to permit free travel of the cable over the pulley 23. By moving the bearing sections towards each other by the adjustment of the wing nut 30 on the bolt 29, said bearing sections can be caused to grip the cable and thereby lock the cable against either inward or outward movement with respect to the bar 1. The pulleys 23 and their mountings besides guiding the movement of the cables provide means for gripping and locking the cables in any of their adjusted positions. By this arrangement the bar 1 may be caused to assume various inclined positions, one of which is suggested in dotted lines in Figure 1, thereby permitting greater space to be had upon one side of the motor vehicle when desiring to work upon the engine still maintaining both hood sections raised or elevated from their normal engine covering position.

Each fender clamp 22 consists of a shank 32 to which the cable 21 is connected and said shank is bent upon itself to form a flexible jaw 33 adapted to cooperate with the shank in gripping a fender. A clip 34 is carried by the jaw 33 and straddles the shank 32 and has pivoted thereto a lever 35 having an angularly related portion 36 to which a roller 37 is journaled. By swinging the lever 35 in one direction the roller will contact with the shank and cause the jaw to move towards said shank for the purpose of gripping the fender. A clamp of this character will remain applied to the fender until the lever 35 is positioned to disengage the roller 37 from the shank thereby obviating any danger of the clamp becoming accidentally disconnected from the fender when slack may occur in the cable as suggested in dotted lines in Figure 1.

The bar 1 intermediate its ends is provided with an eye element 38 to which a suspension cable 39 may be connected. The suspension cable 39 may be suitably connected to a ceiling of a room for supporting the bar or for raising the hood as a unit from the vehicle.

Having described the invention, I claim:

1. A support for motor vehicle hoods comprising a bar adapted to be arranged transversely of a hood with the sections of the hood in engagement therewith and in a raised position with respect to the motor vehicle, means carried by the bar for clamping the hood sections to said bar, means whereby said bar may be tilted and retained at different inclinations, and tension cables carried by the bar and connectible with fixed elements, and means carried by the bar to releasably grip the cables to permit adjustment of the bar into different inclined positions and to retain said bar in any of its adjusted positions.

2. A support comprising a bar to engage with sections of a motor vehicle hood when said sections are in an elevated position and including telescopic sections to permit the bar to be adjusted as to length, heads carried by the sections of the bar, manually operated hood clamps carried by said heads to engage the hood sections and cooperate with the bar in releasably gripping said hood sections, locking means between the sections of the bar and releasable by the hood clamps moving into hood disengaging position, and means for supporting the bar.

3. A support for motor vehicle hoods comprising a telescopic bar, pin and rack means for releasably securing the telescopic bar in adjusted position as to length, heads carried by the bar, arms on said heads, hood engaging arms pivoted to said first arms to engage with the hood sections and cooperate with the bar in gripping said hood sections, hand levers pivoted to the heads, means connecting the hand levers to the hood engaging arms for adjusting said arms to engage and disengage with the hood sections, and means for supporting the bar.

4. A support for motor vehicle hoods comprising a telescopic bar, pin and rack means for releasably securing the telescopic bar in adjusted position as to length, heads carried by the bar, arms on said heads, hood engaging arms pivoted to said first arms to engage with the hood sections and cooperate with the bar in gripping said hood sections, hand levers pivoted to the heads, members pivotally connected to the first-named arms and yieldably connected to the hood engaging arms, arcuate shaped links pivoted to said members and to the levers, and means for supporting the bar.

5. A support for motor vehicle hoods comprising a bar adjustable as to length, heads carried by said bar, means carried by said heads to cooperate with the bar in gripping sections of a hood, combined guide and tensioning means carried by said head, cables trained over said means, guides carried by the heads to receive the cables, clamps carried by the cables to engage fixed objects, and spring means carried by said bar for tensioning the cables and for permitting said cables to feed into and out of the bar.

6. A support for motor vehicle hoods comprising an adjustable bar, heads carried by said bar, hood gripping means carried by said heads, spring cable supporting means in the bar, said heads including spaced flexible walls, sectional bearing elements engageable with said walls, guide pulleys located between the bearing sections, cables trained over said pulleys and connected to cable supporting means, clamps connected to said cables for connecting the latter to fixed objects, springs between the bearing sections, and adjusting bolts extending through the walls of the heads, bearing sections and pulleys whereby said bearing sections may be caused to releasably grip the cables.

7. A support comprising a bar connected to free edges of pivotally mounted hood sections, means connected to a fixed member and yieldably connected to said bar, to permit the latter to be moved into different positions, and means connected with said bar and said first means to retain the bar in any of its positions.

KARL D. STORCH.